(12) United States Patent
Song et al.

(10) Patent No.: US 8,813,312 B2
(45) Date of Patent: Aug. 26, 2014

(54) HINGE FOR DISPLAY DEVICE

(71) Applicant: Prexco Co., Ltd., Nonsan-si (KR)

(72) Inventors: In-Sung Song, Siheung-si (KR); Seung Hee Cho, Incheon (KR)

(73) Assignee: Prexco Co., Ltd., Chungcheongnam-Do (KR)

( * ) Notice: Subject to any disclaimer, the term of this patent is extended or adjusted under 35 U.S.C. 154(b) by 0 days.

(21) Appl. No.: 13/917,157

(22) Filed: Jun. 13, 2013

(65) Prior Publication Data

US 2014/0196253 A1 Jul. 17, 2014

(30) Foreign Application Priority Data

Jan. 11, 2013 (KR) ................. 10-2013-0003351

(51) Int. Cl.
 *E05D 15/32* (2006.01)
 *G06F 1/16* (2006.01)

(52) U.S. Cl.
 CPC .................................. *G06F 1/1601* (2013.01)
 USPC .................... 16/370; 16/225; 16/302; 16/369

(58) Field of Classification Search
 USPC ........... 16/225–227, 302, 303, 304, 366, 368, 16/369, 370, 371
 See application file for complete search history.

(56) References Cited

U.S. PATENT DOCUMENTS

| | | | | |
|---|---|---|---|---|
| 4,995,144 A * | 2/1991 | Gateley | ............................ | 16/261 |
| 5,148,850 A * | 9/1992 | Urbanick | ................... | 160/231.1 |
| 6,055,705 A * | 5/2000 | Komatsu et al. | ................. | 16/225 |
| 6,968,056 B2 * | 11/2005 | Barnett et al. | ........... | 379/433.13 |
| 7,082,196 B2 * | 7/2006 | Kauhaniemi et al. | ......... | 379/447 |
| 7,082,318 B2 * | 7/2006 | Wilson | ........................ | 455/575.1 |
| 7,251,323 B2 * | 7/2007 | Holtorf et al. | ........... | 379/433.13 |
| 7,328,481 B2 * | 2/2008 | Barnett | ........................... | 16/227 |
| 8,091,178 B2 * | 1/2012 | Degner et al. | .................... | 16/285 |
| 8,125,759 B2 * | 2/2012 | Fukuma et al. | ............. | 455/575.3 |
| 8,713,759 B2 * | 5/2014 | Cai | ............................... | 16/366 |
| 2005/0055807 A1 * | 3/2005 | Maatta et al. | ................... | 16/366 |
| 2010/0232100 A1 * | 9/2010 | Fukuma et al. | ........... | 361/679.01 |
| 2012/0110784 A1 * | 5/2012 | Hsu et al. | ........................ | 16/226 |
| 2012/0120618 A1 * | 5/2012 | Bohn | ............................ | 361/749 |
| 2012/0147542 A1 * | 6/2012 | Kim | ........................... | 361/679.28 |
| 2013/0219663 A1 * | 8/2013 | Cai | ............................... | 16/371 |
| 2013/0318746 A1 * | 12/2013 | Kuramochi | ..................... | 16/342 |
| 2014/0007376 A1 * | 1/2014 | Brewer et al. | ................... | 16/225 |
| 2014/0007377 A1 * | 1/2014 | Masini et al. | ................... | 16/225 |

FOREIGN PATENT DOCUMENTS

KR 1020100112383 A 10/2010

* cited by examiner

*Primary Examiner* — Jeffrey O Brien
(74) *Attorney, Agent, or Firm* — R. Neil Sudol; Henry D. Coleman

(57) ABSTRACT

The present invention provides a hinge for a display device. A hinge for a display device according to the present invention, which connects and folds/unfolds first and second plates in a display device, includes: a soft plate member that is bendable while connecting first and second plates; a plurality of ribs formed at regular intervals at both sides of the soft plate member; a link means connecting the ribs and composed of first and second link and individually rotating with the bending of the soft plate member; and a fixing mechanism generating a fixing force by spring elasticity to control the rotation angle of the first and second links of the link means.

7 Claims, 4 Drawing Sheets

HINGE FOR DISPLAY DEVICE

CROSS-REFERENCE TO RELATED APPLICATION

This application is based on and claims priority from Korean Patent Application No. 10-2013-0003351, filed on Jan. 11, 2013 in the Korean Intellectual Property Office, the disclosure of which is incorporated herein in its entirety by reference.

BACKGROUND OF THE INVENTION

1. Field of the Invention

The present invention relates to a hinge for a display device, and more particularly, to a hinge for a display device that is folded/unfolded at a folding portion of flexible display device allowing portable terminals such as a tablet PC with a foldable front, which is a display, to be smoothly flexible and foldable and that can be safely folded by preventing damage to the display device due to excessive folding.

2. Description of the Related Art

In general, portable terminals, such as a smartphone and a tablet PC that can access the internet by improving mobile phones, are greatly popular in recent years in debt to developments in the communication technology and the semiconductor and optical technologies and it changes all the life environments of human and brings remarkable renovation to a science technology.

In particular, the tablet PC has a wide display screen but a large volume and thus is inconvenient to be carried.

As an alternative for this inconvenience, a flexible display having flexibility has been proposed.

As a conventional art relating to the flexible display substrate that is foldable/unfoldable, 「F Flexible display substrate」 has been disclosed in Korean Patent Application No. 10-2009-0030869.

The flexible display means a display that can be rolled, or curved or bent like paper, and freely designed at its outer wall.

Further, the flexible display may be understood as a strong display without breaking since the substrate has flexibility and may be understood as a thin & light display by using a thin and light substrate such as plastic in some cases.

The most basic type would be the flexible display that can be carried with the volume reduced to a half by folding it into a half.

Even in this foldable type, it is preferable that the flexible display cannot be bent and folded like paper to be folded but can be folded with smooth curvature.

SUMMARY OF THE INVENTION

The present invention has been made in an effort to provide a hinge for a display device which is folded/unfolded at a folding portion of flexible display device and that can safely fold/unfold with smooth curvature to prevent damage to a displace screen due to excessive folding.

According to an aspect of the present invention, a hinge for a display device, which connects and folds/unfolds first and second plates in a display device, may include: a soft plate member that is bendable while connecting first and second plates; a plurality of ribs formed at regular intervals at both sides of the soft plate member; a link means connecting the ribs and composed of first and second link which individually rotates with the bending of the soft plate member; and a fixing mechanism generating a fixing force by spring elasticity to control the rotation angle of the first and second links of the link means, in which a folded or unfolded angle may be maintained by a fixing force generated by the fixing mechanism.

The first and second links each may include a hollow cylindrical body in which an internal channel is formed, with both end open and a panel extending from the body and connected to the ribs wherein the panels of the first and second links may be connected to two adjacent ribs arranged in the opposite directions, respectively.

The hinge includes a shaft pin connected to the fixing mechanism through the first and second links.

The fixing mechanism may include: an operation member having a protrusion on one side which is locked to one side of the second link, fitted on the shaft pin, and disposed between the first and second links; and an elastic member combined with the first link and generating a force pushing the operation member, in which protrusion grooves may be formed on one side of the second link to correspond to the protrusion of the operation member.

Two protrusions and two protrusion grooves may be symmetrically formed in pairs, respectively.

The protrusions and the protrusion grooves may be formed in a semicircular shape.

The soft plate member may have: first and second plate portions connected with the first and second plates, respectively; and a curved portion connected with the first and second plate portions and mounted on the outer side of the hinge.

The curved portion may be formed by connecting a plurality of mounting surfaces where the brackets of the ribs are mounted and the mounting surfaces may each have a folding portion formed in the width direction for easy bending.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein:

FIGS. 5 and 6 are cross-sectional views showing the operation of the fixing mechanism shown in FIG. 4, in which FIG. 5 shows a locked status and FIG. 6 shows an unlocked status.

DETAILED DESCRIPTION OF THE PREFERRED EMBODIMENTS

Hereinafter, exemplary embodiments of the present invention are described in detail with reference to the accompanying drawings.

Figure 1:
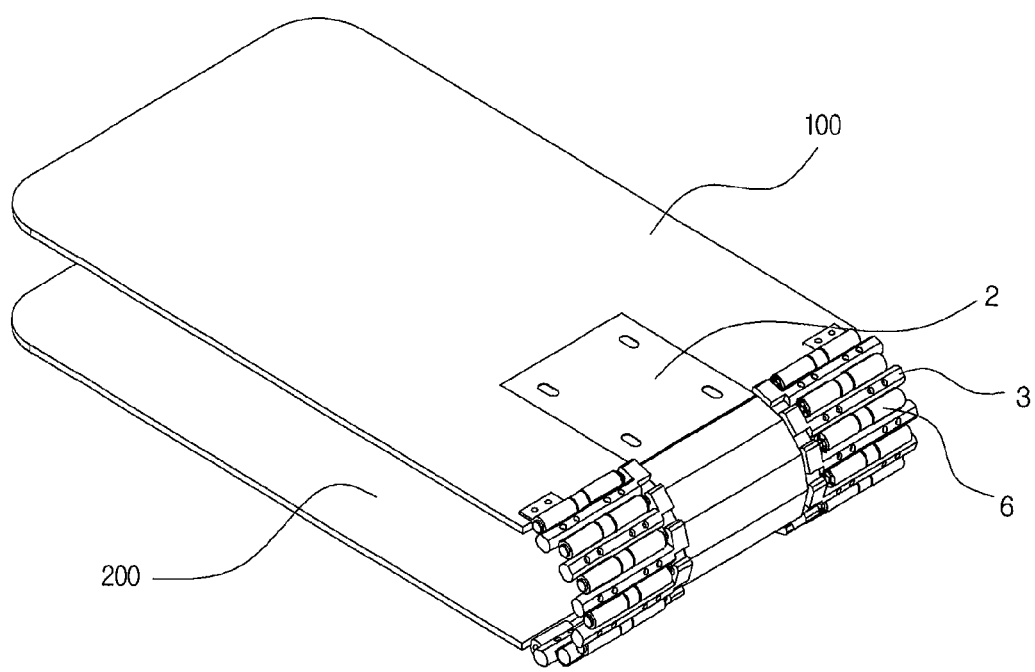
FIG. 1 is a perspective view showing when a hinge for a display device according to the present invention is folded.
Figure 2:
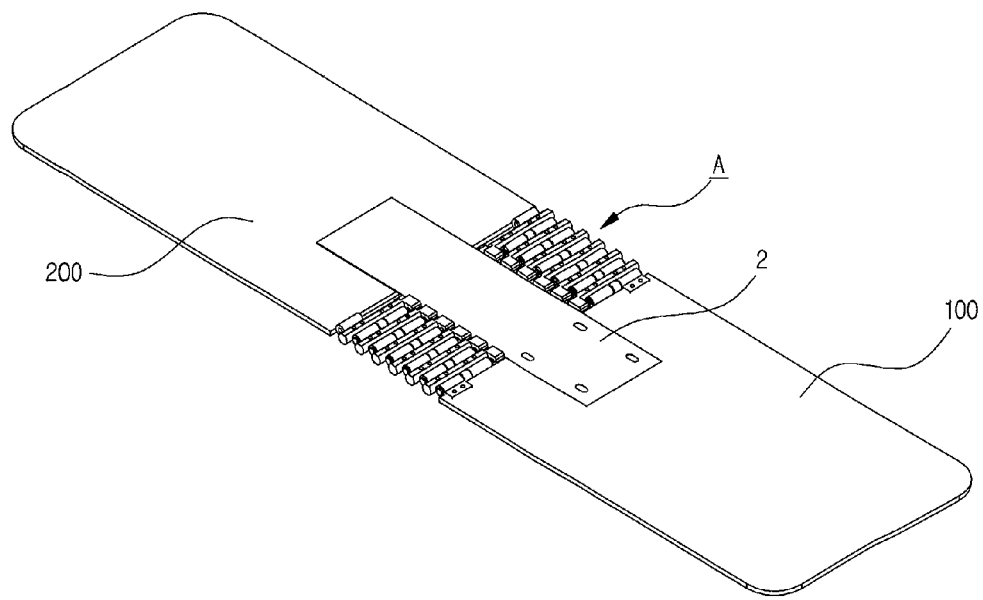
FIG. 2 is a perspective view showing when the hinge for a display device according to the present invention is unfolded.
Figure 3:
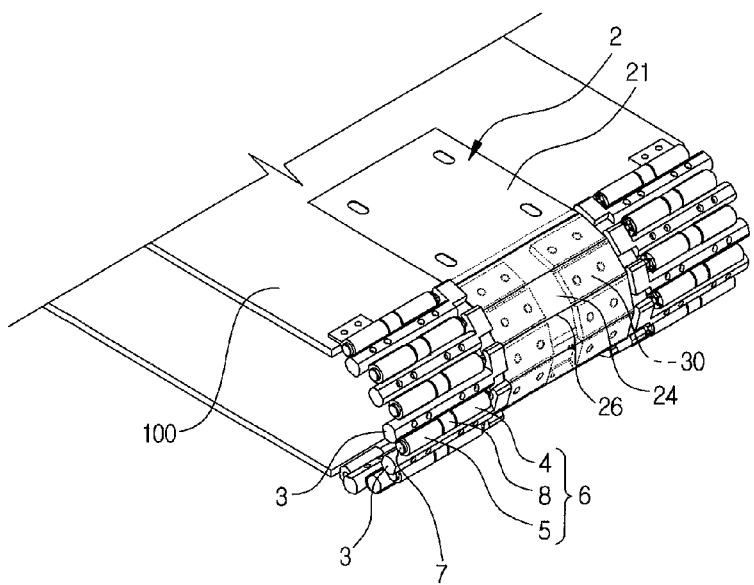
FIG. 3 is an enlarged perspective view showing the hinge in the folded status of FIG. 1.
Figure 4:
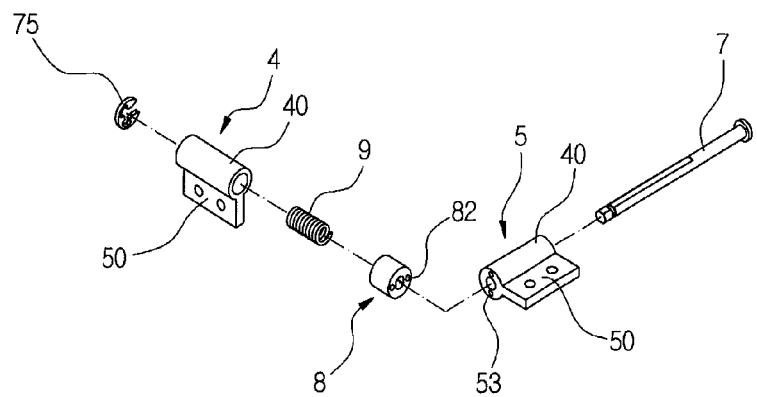
FIG. 4 is an exploded perspective view showing a fixing mechanism in FIG. 3.
Figure 5:
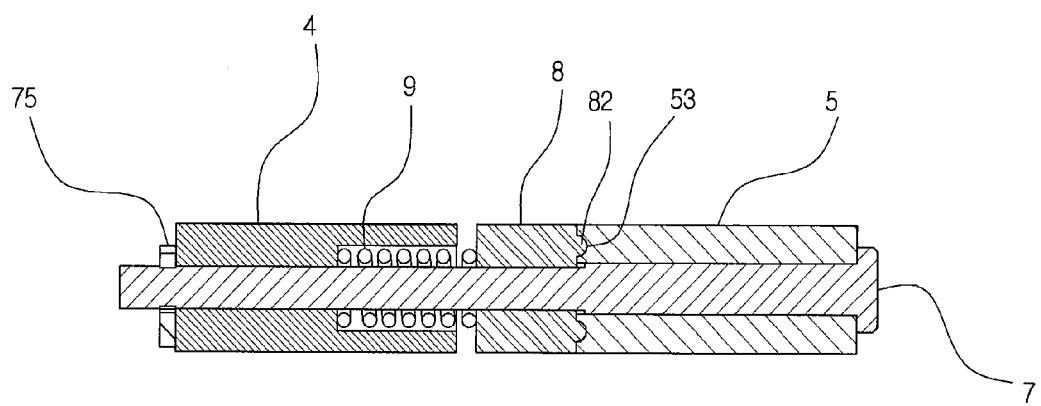
Figure 6:
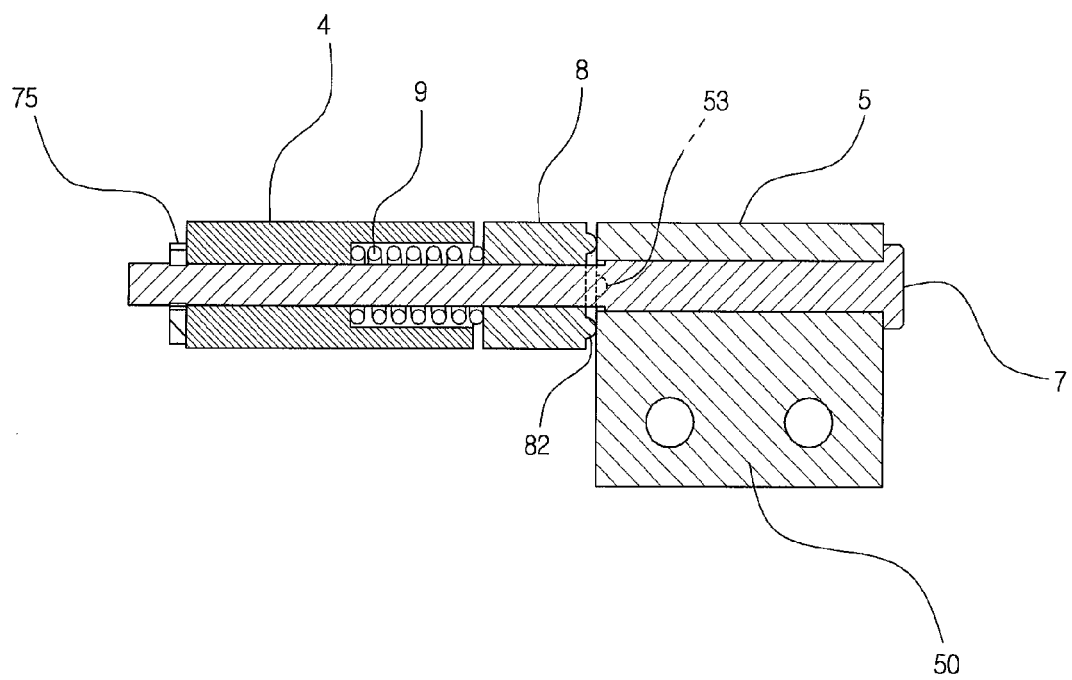

In the accompanying drawings, FIG. 1 is a perspective view showing when a hinge for a display device according to the present invention is folded, FIG. 2 is a perspective view showing when the hinge for a display device according to the present invention is unfolded, FIG. 3 is an enlarged perspective view showing the hinge in the folded status of FIG. 1, FIG. 4 is an exploded perspective view showing a fixing mechanism in FIG. 3, and FIGS. 5 and 6 are cross-sectional views showing the operation of the fixing mechanism shown in FIG. 4, in which FIG. 5 shows a locked status and FIG. 6 shows an unlocked status.

As shown in FIGS. 1 to 6, a hinge for a display device according to an embodiment of the present invention includes: first and second plates 100 and 200 each having a predetermined area; a soft plate member 2 that is bendable while connecting the first and second plates 100 and 200 to connect and fold the first and second plates 100 and 200; a plurality of ribs 3 formed at regular intervals at both sides of the soft plate member 2; a link means connecting the ribs 3 and composed of first and second link 4 and 5 individually rotating with the bending of the soft plate member 2; and a fixing mechanism 6 generating a fixing force by spring elasticity to control the rotation angle of the first and second links 4 and 5 of the link means.

The hinge according to the present invention, provided for folding the first and second plates 100 and 200, generally guides the plates not to be angled but to be folded with smooth curvature to prevent damage to a flexible display substrate. The fixing mechanism 6 is provided to maintain the folded or unfolded angle of the first and second plates 100 and 200 by generating an appropriate fixing force.

The first and second links 4 and 5 included in the fixing mechanism 6 have the same shape and each includes a hollow cylindrical body 40 in which an internal channel is formed, with both end open and a panel 50 extending from the body 40 and connected to the ribs.

The panels 50 of the first and second links 4 and 5 are arranged in opposite directions and connected to any one of two adjacent ribs 3, respectively.

The rib 3 is formed in a rod shape on a side of a bracket 30 having a wide area and has a recessed groove so that the panels 50 of the first and second links 4 and 5 are coupled to the outer circumferences, and the bracket 30 is combined with the soft plate member 2.

Since the rib 3 has a rod shape narrower than the bracket 30, when a plurality of ribs 3 are arranged in parallel, a space to which the link means can be fitted is defined between the ribs 3.

The link means includes the first and second links 4 and 5, the first and second links 4 and 5 may be integrated by inserting a shaft pin 7 in the links, and the fixing mechanism 6 including the first and second links 4 and 5 is provided.

The fixing mechanism 6 includes: an operation member 8 having a protrusion 82 on one side thereof, fitted on the shaft pin 7, and disposed between the first and second links 4 and 5; and an elastic member 9 combined with the first link 4 and generating a force pushing the operation member 8.

The shaft pin 7 has one end inserted in the first link through the operation member from the second link and then fitted in a snap ring 75 in order not to be separated.

A protrusion groove 53 is formed on one side of the second link 5 to correspond to the protrusion 82 of the operation member 8.

Two protrusions 82 and two protrusion grooves 53 are symmetrically formed in pairs, respectively, in this configuration and they are formed in a semicircular shape to minimize friction in rotation.

Two protrusions 82 are symmetrically formed on one side of the operation member 8 and two protrusion grooves 53 are symmetrically formed on one side of the second link 5, in which the protrusion 82 and the protrusion grooves 53 are not formed at specific positions, but randomly disposed.

Therefore, as shown in FIGS. 5 and 6, while a plurality of operation members 8 and second links 5 are folded or unfolded by rotating, the protrusions 82 and the protrusion grooves 53 of some of the operation members 8 and second links 5 are fitted and the others are not fitted.

As the protrusions 82 and the protrusion grooves 53 on some of the operation members 8 and second links 5 are fitted, an appropriate fixing force can be generated, and thus the rotation angle of the first and second plates 100 and 200 can be appropriately maintained.

The elastic member 9 is a coil spring with one end inserted, fixed, and supported in the first link 4 and the other end supported by the other side of the operation member 8, generating an appropriate pushing force.

The appropriate pushing force means a resistant force allowing the first and second plates to be slowly folded so that a shock is not generated.

The soft plate member 2 connecting the first and second plates 100 and 200 spaced at a predetermined distance from each other has first and second plate portions 21 at both ends which are connected to the first and second plates 100 and 200, respectively, and a curved portion at the center to be bendable and stretchable.

The curved portion is formed by connecting a plurality of mounting surfaces 24 where the brackets 30 of the ribs 3 are mounted and the mounting surfaces 24 each have a folding portion 26 formed in the width direction for easy bending.

The bracket 30 of the rib 3 is brought in close contact with the inner side of the folding portion 26 and then fixed by bolting or spot welding.

Hereinafter, the operation of the present invention having the configuration is described.

As shown in FIGS. 1 and 3, as the flexible display device is folded, the hinge is rolled.

That is, even though it is folded to form a circle, the portion where the hinge is disposed has smooth curvature, and accordingly, a curved line is made such that a deformation is not caused to the flexible display screen.

The folding process is described. The first and second links 4 and 5 are rotated with rotation of the ribs 3 connected to them and the protrusions 82 of the operation member 8 supported by the elastic member 9 are supported on one side of the second link 5 and generates a resistant force, when being separated from the corresponding protrusion grooves 53; therefore, the problem of rapid folding can be prevented and they are slowly folded.

However, the protrusions 82 of some of the operation members 8 are inserted in the protrusion grooves 53 of the corresponding second links 5 and firmly supported by elastic force of the elastic members 9, and therefore, a pushing force under appropriate tension is provided, and as a result, the entire fixing status can be stably maintained.

Similarly, when the first and second plates 100 and 200 are unfolded, some of the protrusions 82 and the protrusion grooves 53 of the operation members 8 and the second links 5 are fitted, even if some of them are separated, so that they can be firmly held by the elastic force of the elastic members 9.

According to the present invention, the operation for folding or unfolding the screen of a flexible display device can be smoothly operated and damage to the display screen can be prevented, resulting in remarkable improvement in reliability of a product. Although the present invention was described above with reference to the exemplary embodiments stated above, those skilled in the art can easily recognize that the present invention may be changed and modified in various ways without departing from the spirit and scope of the present invention and it is apparent that the changes and modifications are all included in claims.

What is claimed is:

1. A hinge for a display device which connects and folds/unfolds first and second plates in a display device, the hinge comprising:
- a soft plate member that is bendable while connecting first and second plates;
- a plurality of ribs formed at regular intervals at both sides of the soft plate member;
- a plurality of link mechanisms connecting the plurality of ribs, each link mechanism comprising a first link and a second link which individually rotate with the bending of the soft plate member about a shaft in and a fixing mechanism generating a fixing force by spring elasticity to control the rotation angle of the first and second links of each link mechanism;
- wherein a folded or unfolded angle of each link mechanism is maintained by the fixing force generated by the respective fixing mechanism.

2. The hinge of claim 1, wherein the first and second links each comprise a hollow cylindrical body in which an internal channel is formed, with both ends open and a panel extending from the body and connected to the ribs wherein the panels of the first and second links are connected to two adjacent ribs arranged in opposite directions, respectively.

3. The hinge of claim 1, wherein each fixing mechanism comprises:
- an operation member having a protrusion on one side thereof which is locked to one side of the respective second link, fitted on the respective shaft pin, and disposed between the respective first and second links; and
- an elastic member combined with the respective first link and generating a force pushing the operation member,
- wherein protrusion grooves are formed on one side of the respective second link to correspond to the protrusion of the operation member.

4. The hinge of claim 3, wherein two protrusions and two protrusion grooves are symmetrically formed in pairs, respectively.

5. The hinge of claim 4, wherein the protrusions and the protrusion grooves are formed in a semicircular shape.

6. The hinge of claim 1, wherein the soft plate member has:
- first and second plate portions connected with the first and second plates, respectively; and
- a curved portion connected with the first and second plate portions and mounted on an outer side of the first and second plates.

7. The hinge of claim 6, wherein the curved portion is formed by connecting a plurality of mounting surfaces where a plurality of brackets extending from the ribs are mounted and the mounting surfaces each have a folding portion formed in the width direction for easy bending.

* * * * *